United States Patent
Stevens

(10) Patent No.: US 9,308,744 B2
(45) Date of Patent: Apr. 12, 2016

(54) BLISTER PACKAGE PRINTER

(75) Inventor: Gerard Stevens, Huntleys Point (AU)

(73) Assignee: Manrex Pty Ltd., Lelchhardt, NSW (AU)

( * ) Notice: Subject to any disclaimer, the term of this patent is extended or adjusted under 35 U.S.C. 154(b) by 0 days.

(21) Appl. No.: 14/237,159

(22) PCT Filed: Jul. 18, 2012

(86) PCT No.: PCT/AU2012/000860
§ 371 (c)(1),
(2), (4) Date: Apr. 3, 2014

(87) PCT Pub. No.: WO2013/016757
PCT Pub. Date: Feb. 7, 2013

(65) Prior Publication Data
US 2014/0209498 A1    Jul. 31, 2014

(30) Foreign Application Priority Data
Aug. 4, 2011 (AU) ............................... 2011903092

(51) Int. Cl.
| | | |
|---|---|---|
| B41J 3/407 | (2006.01) | |
| B41J 29/38 | (2006.01) | |
| B65B 61/26 | (2006.01) | |
| B41J 11/20 | (2006.01) | |
| B41J 25/304 | (2006.01) | |
| A61J 7/04 | (2006.01) | |
| B65D 75/36 | (2006.01) | |
| G06K 15/02 | (2006.01) | |

(Continued)

(52) U.S. Cl.
CPC .. B41J 3/407 (2013.01); A61J 7/04 (2013.01); B41J 11/20 (2013.01); B41J 11/46 (2013.01); B41J 25/304 (2013.01); B41J 29/38 (2013.01); B65B 61/26 (2013.01); B65D 75/367 (2013.01); G06K 15/023 (2013.01); A61G 2205/10 (2013.01); A61G 2205/30 (2013.01); A61J 1/035 (2013.01); B65B 9/045 (2013.01)

(58) Field of Classification Search
CPC ........ B41J 3/407; B41J 3/4073; B41J 25/304; B41J 25/308; B65B 61/26
See application file for complete search history.

(56) References Cited

U.S. PATENT DOCUMENTS 6,059,391 A * 5/2000 Fulkerson et al. ................ 347/2
7,797,909 B2   9/2010 Ream
(Continued)

FOREIGN PATENT DOCUMENTS

AU            762020 B       6/2003
AU       2011903092 A        8/2011
(Continued)

*Primary Examiner* — Daniel J Colilla
(74) *Attorney, Agent, or Firm* — Chernoff, Vilhauer, McClung & Stenzel, LLP

(57) ABSTRACT

An assembled blister package has a blister sheet formed with blisters sealed by a foil backing sheet. The blister package is sandwiched between opposite sides of a folded card (not shown) to stiffen it. Each of these sides has a rectilinear array of windows defining discrete areas on which to print. A header sheet on which a bar-code is printed is attached to the backing sheet, and a reader is positioned to read the bar-code and extract from it information which is fed to an ink-jet printer. Two stepping motors are used to control the position of the printer as information is printed on the respective discrete areas of the array. The printer can be spaced from the backing sheet by a sufficient distance to enable it to print without obstruction.

1 Claim, 6 Drawing Sheets

(51) Int. Cl.
*B41J 11/46* (2006.01)
*A61J 1/03* (2006.01)
*B65B 9/04* (2006.01)

(56) References Cited

U.S. PATENT DOCUMENTS

2009/0087243 A1* 4/2009 Niiyama ........................ 400/76
2011/0090277 A1* 4/2011 Pomerantz et al. ............ 347/20
2011/0126495 A1* 6/2011 Tampieri .................. B65B 5/06
  53/447

FOREIGN PATENT DOCUMENTS

| EP | 1714883 A | | 10/2006 | |
|---|---|---|---|---|
| JP | 2000280567 A | * | 10/2000 | ............. B41J 25/308 |
| JP | 2005190084 A | * | 7/2005 | ............. G06K 17/00 |
| WO | 0005078 A | | 2/2000 | |
| WO | 2011109862 A | | 9/2011 | |

* cited by examiner

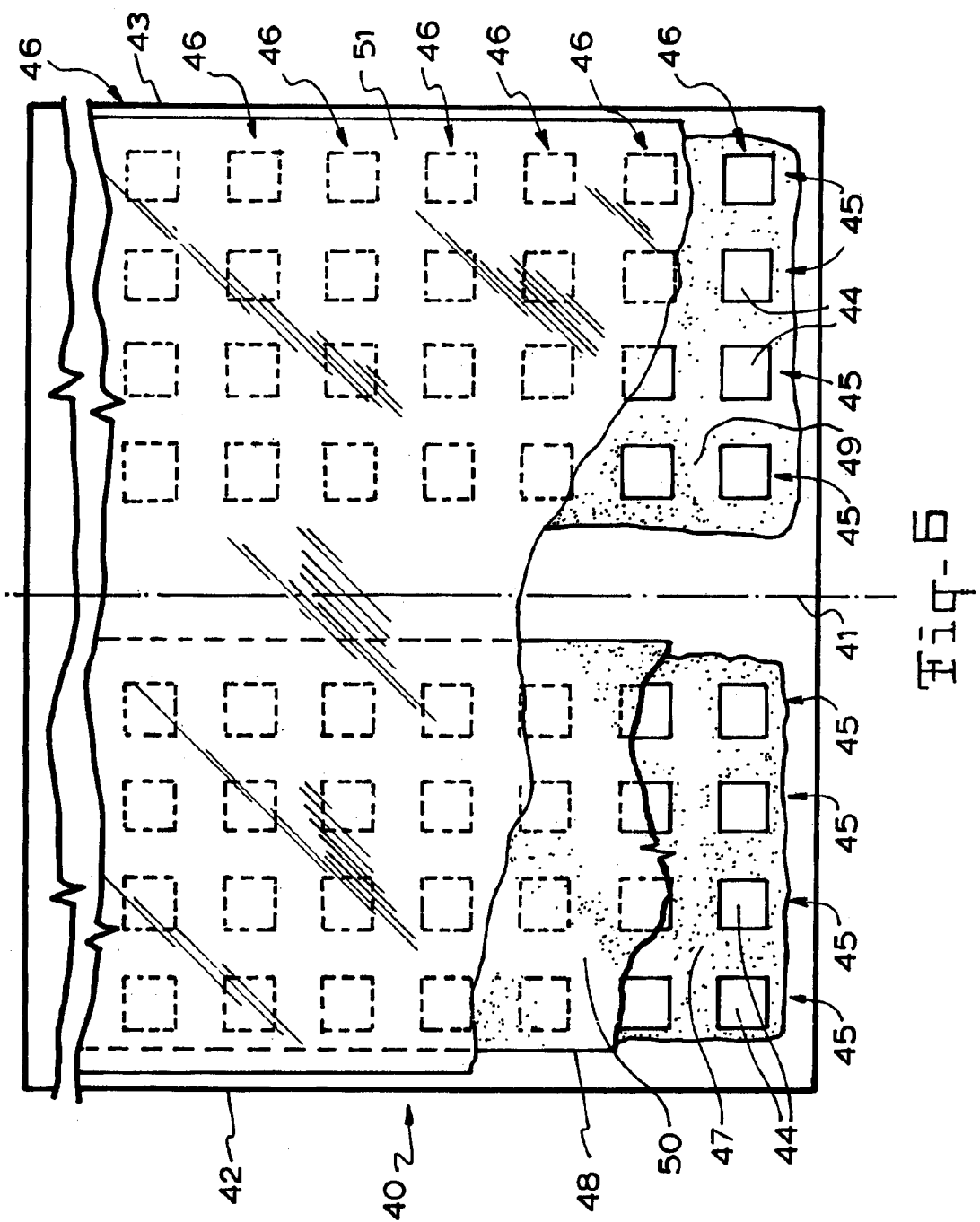

BLISTER PACKAGE PRINTER

FIELD OF THE INVENTION

THIS INVENTION relates to printing discrete areas of an irregular surface using a single printing head.

STATE OF THE ART

The use of a backing sheet carrying writing and sealing a blister of a blister sheet, is common practice in many industries. One such industry is the pharmaceutical industry. Pharmacists are often required to assemble sealed blister sheets provided with blisters containing medication doses prescribed by a doctor. The blister contents are identified by printing located on discrete areas of the exposed surface of the backing sheet used to seal respective blister cavities. The sealed blister sheet is subsequently incorporated into a blister package and this may be sandwiched in a hard, plastics protective folder having an array of windows on each side. The two arrays of windows register with one another when the folder is closed. The windows on one side of the folder enable the flexible transparent blisters to protrude through them, and the array of windows on the other side of the folder respectively frame discrete area of the backing sheet which have printed on them information identifying the contents of the blisters beneath. This identification information is useful in the event of an emergency, as a doctor can see from the blister package whether a patient has ingested the wrong medication, and treat the patient accordingly. Likewise a nurse can see from the transparency of the blisters whether any of the prescribed medication doses have not been administered to the patient at a particular time when medication was required, and can then decide what action should be taken.

The current technique used to assemble a blister package is as follows: The unsealed blister sheet is placed on an apertured horizontal table with the individual blisters facing downwards and located in respective apertures of the table. The medication doses prescribed by a doctor are then loaded into the individual cavities of the blisters by a pharmacist. A metallic thin foil backing sheet having a thin fibrous paper layer adhering to one side, is then passed through a contact printer. A contact printer is one having direct physical contact with the surface being printed. The contact printer provides printing on the paper layer at discrete positions destined to cover individual blisters, this printing identifying the doses loaded into them. The backing sheet is then carefully positioned by, hand over the loaded blister sheet to bring the printing on the exposed paper layer into precise registration with the positions of the corresponding blister cavities beneath. The combination of blister sheet and backing sheet is then sealed together by applying heat and pressure to the exposed surface of the backing sheet. This melts a head-sensitive adhesive layer located between the underside of the backing sheet and coplanar lands of the blister sheet beneath, so that the two are sealed together.

The manual location of the backing sheet with respect to the blister sheet beneath before they can be sealed precisely together, occupies a significant portion of the time required to prepare a sealed blister sheet. Also, when the sealed blister sheet having printing on its backing sheet is subsequently located inside a windowed folder, there is always a risk that part of the print on the backing sheet is hidden beneath a part of the folder framing a window in which the print is to be displayed. Finally when the sealing step is accompanied by application of heat and/or pressure, there is always a risk present that the contents of the blister may be damaged by the heat or that the pressure may so deform the discrete areas of the backing sheet that the printing becomes hard to read.

OBJECT OF THE INVENTION

An object of the invention is to enable print to be applied to discrete areas of a backing sheet of a blister package after the surface of the sheet has been covered by a stiffening stratum having an irregular surface profile.

THE INVENTION

In accordance with one aspect of the invention there is provided a method of manufacturing a blister package having a backing sheet sealing cavities of a blister sheet and providing discrete areas framed by windows of an overlaid stratum covering the backing sheet and having an irregular surface profile to which print is to be applied, the method comprising: loading required objects into the blister cavities; sealing the cavities by applying an adhering backing sheet over them; attaching a windowed stratum to the exposed surface of the backing sheet so that each window is positioned over a respective cavity; and, controlling a non-contact printing head (as below defined) to move it from window to window without touching the stratum so that it passes in a non-contact manner over the irregular surface profile while writing in the discrete areas information to be recorded there.

Preferably the movements of the non-contact printing head are controlled by processor which responds to the output of a bar-code applied to a component of the package.

In accordance with a second aspect of the invention there is provided apparatus for printing information on an array of discrete areas of a backing sheet each covering a cavity of a blister, such information describing the contents of the blister beneath and the backing sheet being covered by an attached salient stratum having an irregular surface profile and formed with windows individually defining the discrete areas, such apparatus being provided with: a reader for extracting the information from a bar-code printed on a component of a blister package to be assembled by the apparatus; a drive system for producing relative stepping movement between the backing sheet and a non-contact printing head (as below defined) to bring it into alignment with each of the discrete areas in turn; an adjustment mechanism for altering the spatial separation between the printing head and the irregular surface profile of the stratum; and, circuitry for supplying the printing head with information provided by the reader of the bar code and significant of the contents of the blister associated with the particular discrete area on which printing is to take place.

The invention further includes a blister package resulting from the use of the method of the invention described above, in which the stratum comprises one side of a folded card between the sides of which the blister package is sandwiched and sealed; the two sides of the card each having an array of windows which register with one another when the card is in a folded condition, and the blister package having its blisters protruding through one array of windows, and the discrete areas individually exposed in the windows of the other side of the card.

The expression "non-contact printing head" is defined in this specification as being a printing head able to print without actually touching the surface onto which the print is to be applied. A liquid-jet printer such as an ink-jet printer is one example of a non-contact printing head. There are other forms of printing head which have a similar characteristic.

ADVANTAGES OBTAINED BY USING ASPECTS OF THE INVENTION

One advantage obtainable by the use of the invention is that, it avoids the previously essential step of manually carefully positioning the pre-printed backing sheet over the blister sheet before they can be sealed together.

A second advantage obtainable by using the invention is that it enables a backing sheet to be stiffened by an adhering superimposed stratum having an irregular surface profile, before printing on discrete areas of the backing sheet actually takes place. This enables a disposable blister package to be quickly and cheaply constructed using a stiffener provided by one or two layers of a cheaply-available card.

Preferably an ink-jet printer is used as the non-contact printing head because it does not contact or heat the surface onto which print is to be applied. Distortion of the surface by applying pressure to it is thus avoided, and consequential distortion of the printing does not take place. This is particularly advantageous as it facilitates the use with the blister package of a cheap, thin and disposable folder providing an array of windows providing the discrete areas to which the print is to be applied. The folder is preferably made from paper card and may be attached to the blister sheet by an adhesive or in some other way, before printing commences. The spatial separation of the ink-jet printer from the backing sheet during printing is sufficient to enable the printer to pass, without obstruction, over surface irregularities caused by the presence of parts of the card attached to and covering the backing sheet so that the printer can be located over each discrete area in turn while printing is being carried out. There is also no risk of any of the printing being hidden beneath marginal edges of the card surrounding the discrete areas, because printing now takes place after the card has been attached to the backing sheet.

INTRODUCTION TO THE DRAWINGS

The invention will now be described in more detail, by way of example, with reference to the accompanying partly diagrammatic and schematic drawings, in which:—

In the Drawings

Figure 2:
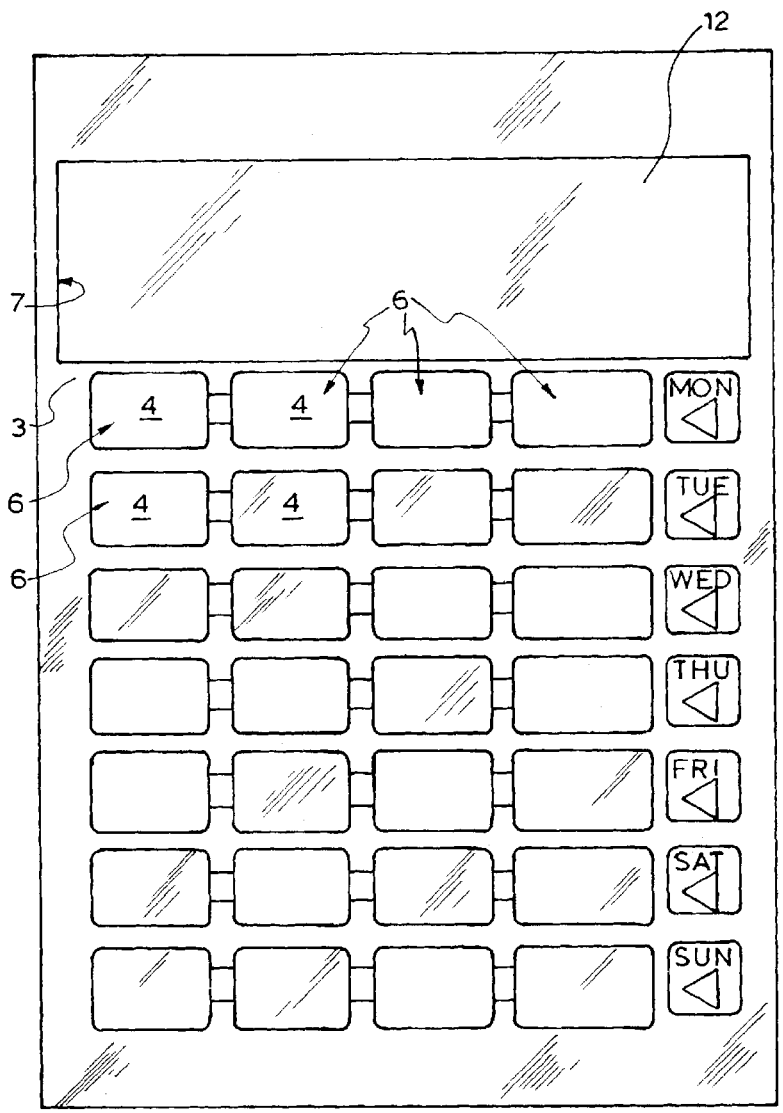
FIG. 2 is a back view of the assembled package of FIG. 1 as seen prior to the contents of each blister being printed on a respective discrete area of the unprinted backing sheet covering the cavity of the blister.
Figure 3:
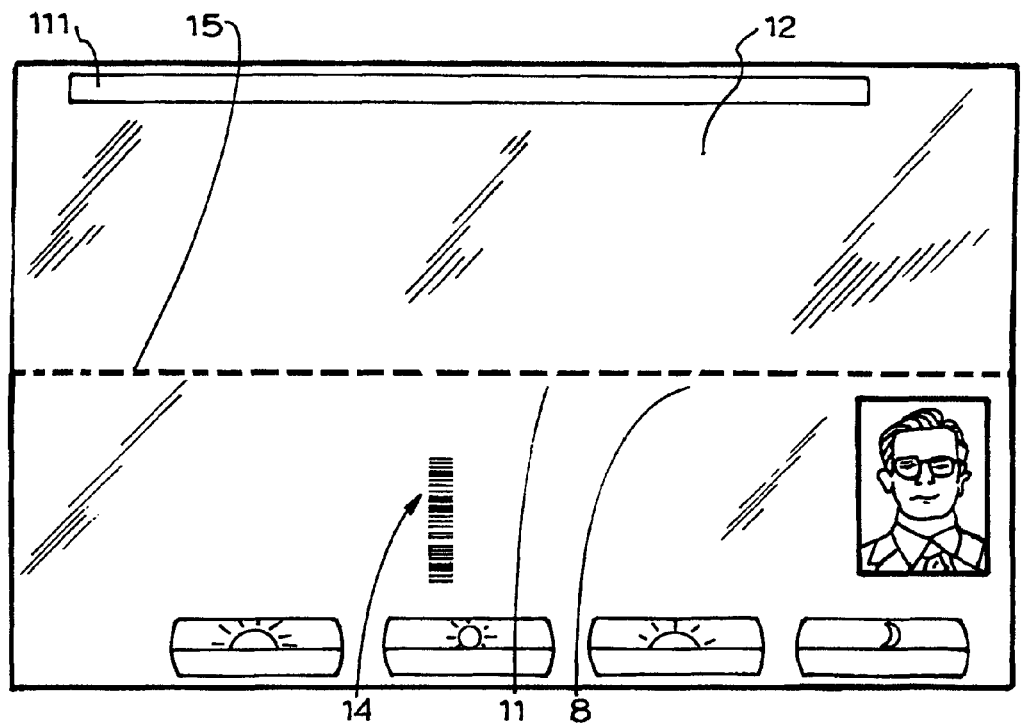
Figure 4:
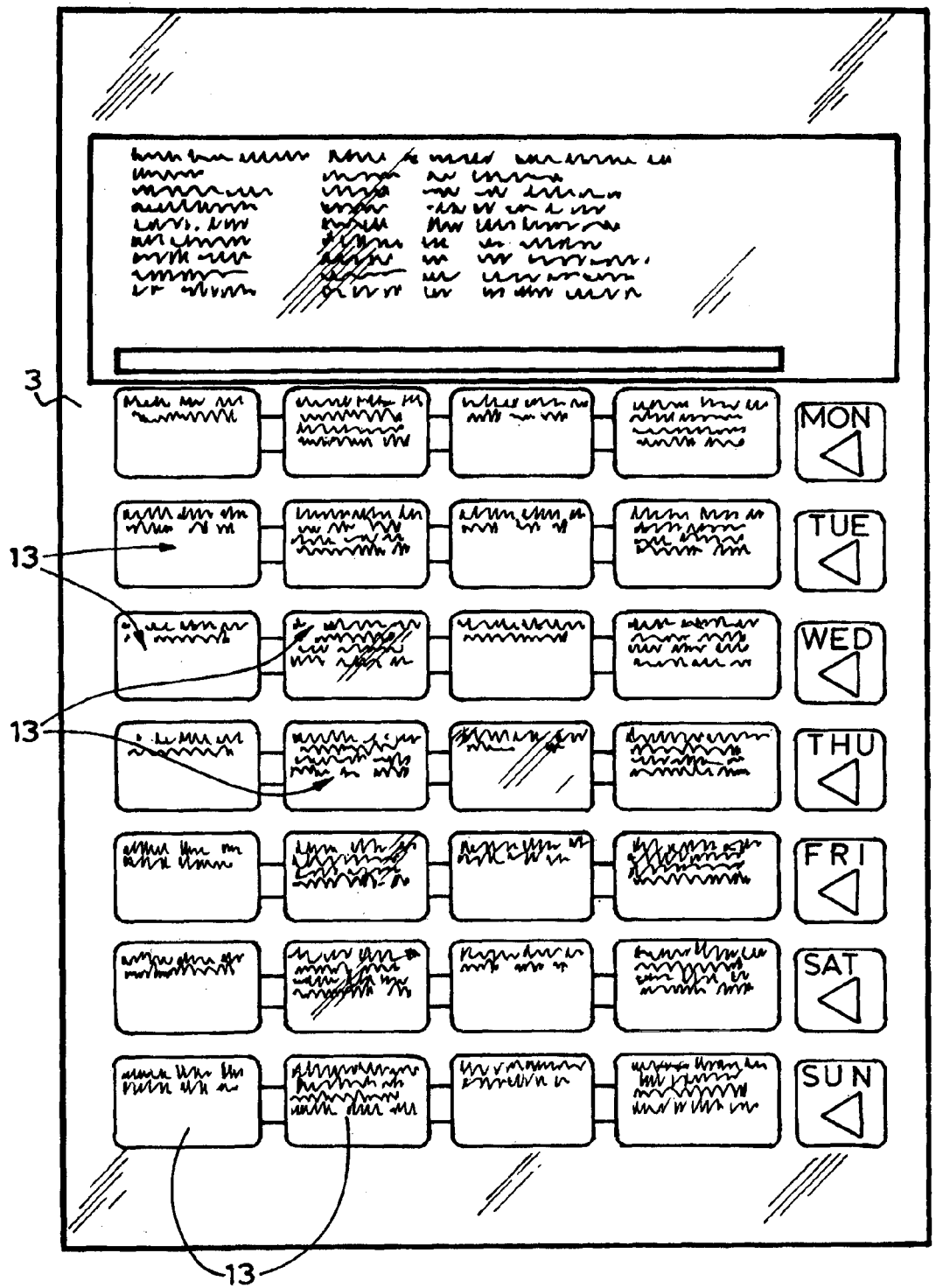
Figure 5:
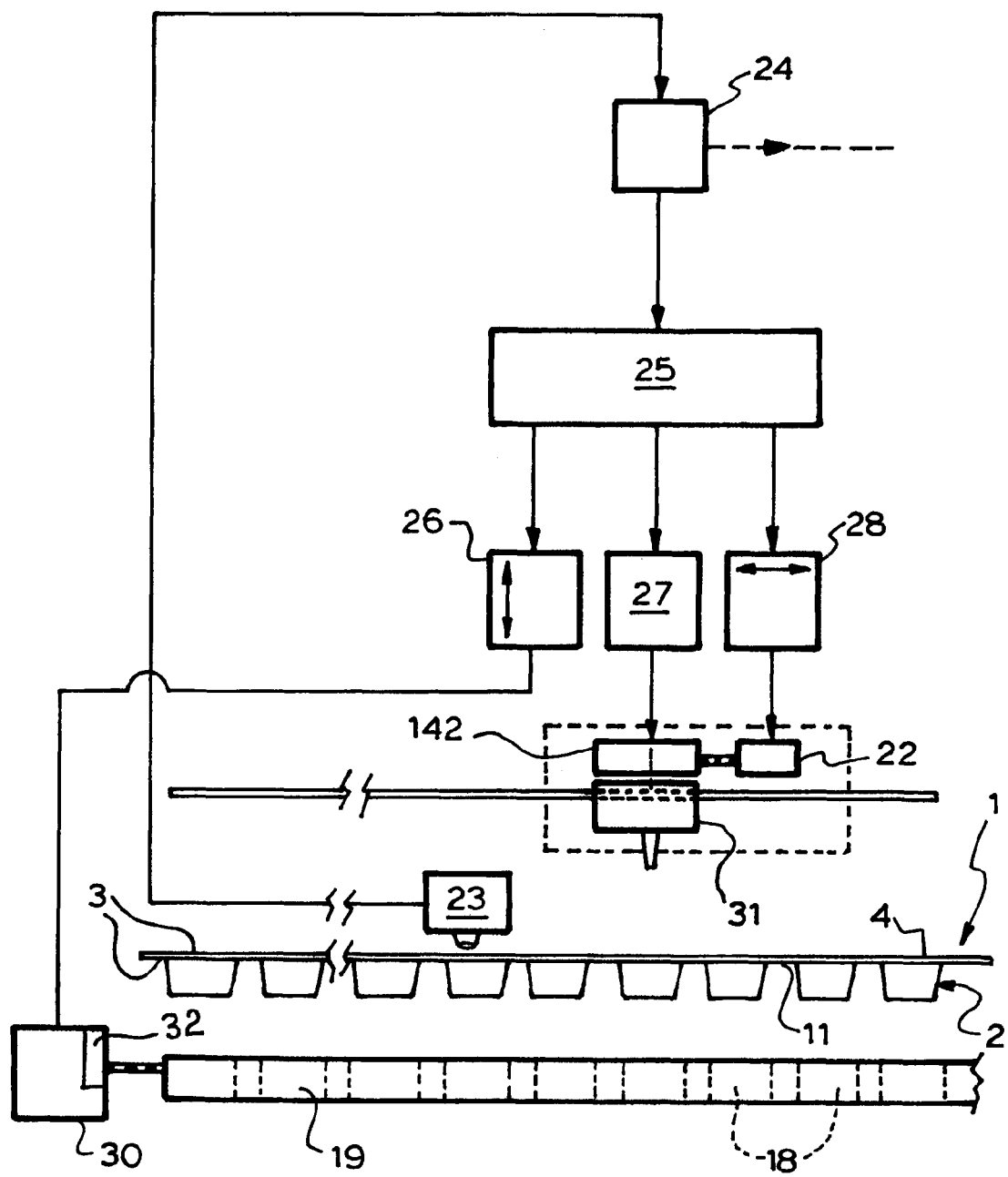

FIG. 3 is a plan view of one face of an attachment sheet secured to one end of the unprinted backing sheet during the assembly of the package and providing a bar code giving information relating to the identity of the patient who is to receive the medication doses, the contents of the individual blister cavities of the blister sheet and instructions for the operation of apparatus used to print writing on the blister package;

FIG. 4 is a view corresponding to FIG. 2 and shows the package after completion of a printing process;

FIG. 5 is a diagrammatic and partially schematic flow diagram used to explain the functioning of one example of apparatus used to carry out the printing of the backing sheet; and, FIG. 6 shows a card folder in plan and partially broken away to expose internal details.

DESCRIPTION OF PREFERRED EMBODIMENT

Figure 1:
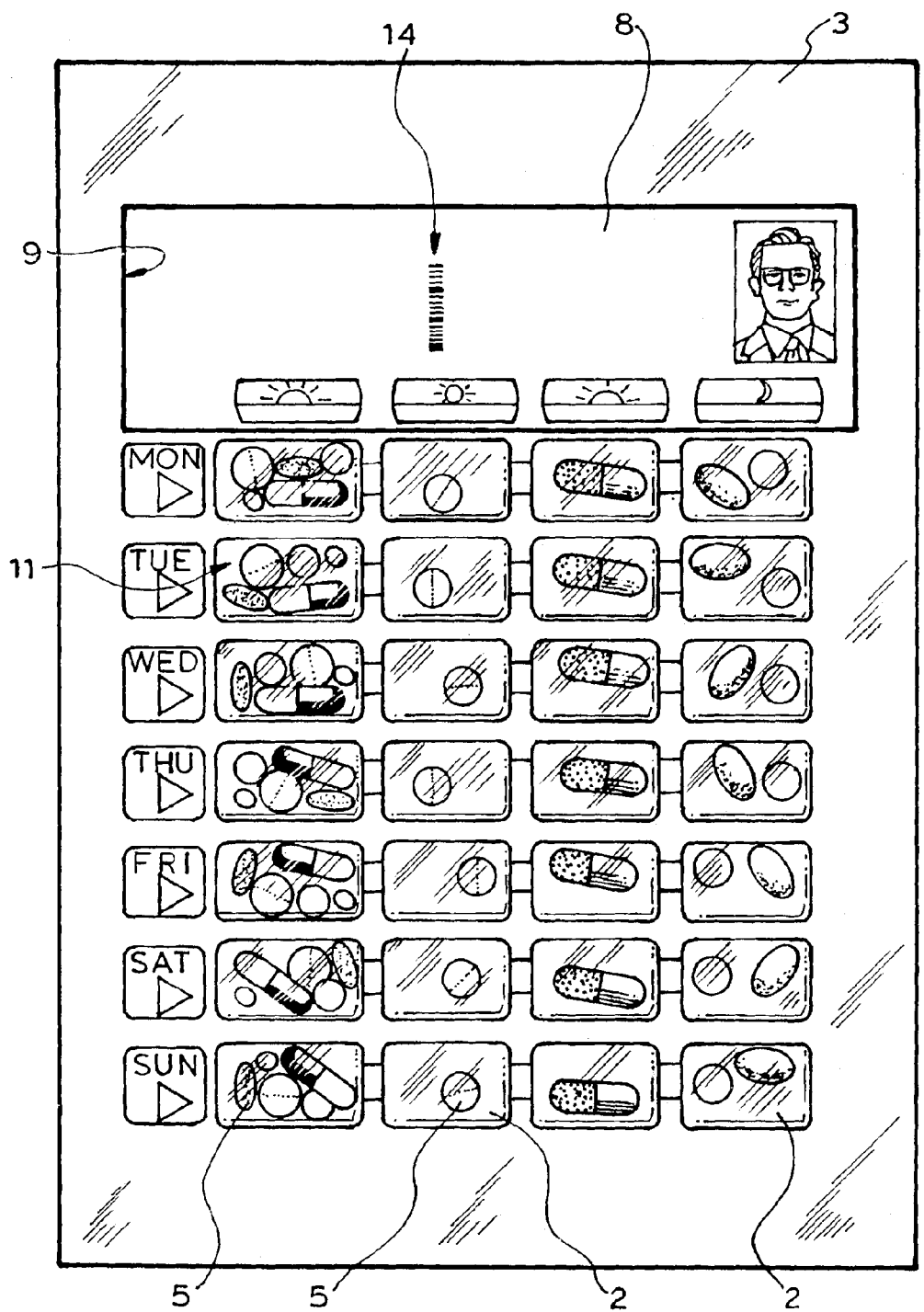
FIG. 1 is a front view of a card folder containing an assembled blister package sandwiched within it.

FIG. 1 shows a front face of a blister package in the form of a thin cardboard folder 3 enclosing a sealed blister sheet 11 sandwiched between and attached to opposite sides of the folder. The blister sheet is made from thin, transparent, flexible plastics material and provides a rectilinear array of manually-depressible blisters 2 arranged in intersection columns and rows, each of the blisters being surrounded by coplanar lands of the blister sheet. As shown in FIG. 2 the back of each blister cavity is covered by a discrete area 4 of a backing sheet made from a frangible metallic foil which is sealed to lands of the blister sheet surrounding the blisters 2. The exposed surface of the backing sheet 4 has a thin adhering paper layer 6 providing a clean white surface for receiving print. The backing sheet 4 serves to seal the blister cavities from ambient air. As is apparent from FIG. 1, medication doses 5 prescribed by a doctor are contained in the cavities of the blisters.

One rectangular end-portion of the backing sheet 4 extends beyond one end of the blister sheet 1 and is joined to a rectangular attachment sheet 111 as shown in FIG. 3. The attachment sheet 111 is formed with a fold line 15 which divides it into two rectangular sections 8 and 12. Each of these sections is prior-printed with identity information relating to the patient and the prescribed medication doses to be administered, such information being stored in a binary bar code 14 positioned in the centre of the first section 8. As shown in FIG. 1, a portion of the first section 8 is displayed on the same side as the blisters 2 of the sealed blister sheet and appears in a rectangular opening 9 provided towards the upper end-portion of the folder 3. The second section 12 of the attachment sheet is folded over the end of the backing sheet 4 so that the information printed on it appears in a second rectangular opening 7 in the underside of the folder 3, as shown in FIG. 2. The second section 12 contains written identification of the patient, identification details of the doctor prescribing the medication, and finally identifies the medication doses 5 contained in the blisters 2 of the package. The attachment sheet 111 may also be provided with a detachable third section (not shown) which can be kept by the pharmacist and used for reference purposes in the future.

As mentioned earlier, the prior art relied upon a pre-printed backing sheet being carefully positioned by hand over the lands of the blister sheet after its cavities have been loaded with the prescribed medication doses. This is avoided by the use of the Applicant's invention, as the printing of the discrete areas of the backing strip is achieved by the use of a non-contact printing head after the assembly of the blister sheet and the backing sheet as shown in FIG. 5. This is possible, as the precise position of each of the blister cavities is known accurately from marginal settings applied to control, inter alia, the position of an apertured table 19 supporting the blister sheet. These marginal settings are provided from information extracted from the bar code 14 by way of a decoder 24 connected between the reader 23 and a processing unit 25, and are used for calibration purposes before loading of the medication doses takes place. A stepping motor 30, shown in FIG. 5, is operated to control the position of the table 19 under the control of a processing unit 26. The stepping motor 30 is closely associated with an adjustment mechanism 32 and which is also controlled by the processing unit 26. The adjustment mechanism 32 determines the spacing between the printing head 31 and the irregular surface profile of the folder 3. This profile results from the presence of the strips of the card folder separating the windows of the folder from one another. A second stepping motor 22 controlled by a processing unit 28 controls the position of the printing head 31. The printing operation of the printing head 31 is controlled by a third processing unit 27 dining the time that the printing head is aligned with a particular discrete area to be printed. The operation of the three processing units 26,27 and 28 and the adjustment mechanism 32 is determined from information provided by the bar code 14.

The printing head 31 is preferably an ink-jet printer as this is capable of printing while being spatially separated from the surface onto which the print is to be applied. This spatial separation is determined by the adjustment mechanism 32 and is selected to be sufficient to allow the printing head 31 to pass without obstruction over the irregular surface profile of the combination of a thin folder 40 shown in FIG. 6, which acts as a stiffener for the assembled, blister package, and the attached backing sheet.

Operation of Preferred Embodiment

As shown in FIG. 5, the unloaded blister sheet 11 is positioned on the table 19 with its blister cavities opening upwardly and its blisters 2 locating in respective apertures 18 of the table 19. Prior to the start of a writing sequence the bar code 14, shown in FIG. 1, is located directly in front of a bar code reader 23. This reads the bar code 14 and transmits its information data to the decoder 24 which transmits it in decoded form to the processing unit 25. This controls operation of three processing units 26,27 and 28 which respectively control the position of the table 19 and operation of the first stepping motor 30 and the adjustment mechanism (not shown), the printing mechanism of the printing head 31, and a second stepping motor 22.

The vertical positioning of the table 19 under the control of the adjustment mechanism 32 first take place to ensure that the movement of the printing head 31 is not obstructed by the irregular surface profile over which it is to pass. At the commencement of printing the printing head 31 is moved to the beginning of the first row of discrete areas to be printed, and is aligned with the first such area in the row. The second processing unit 27 then activates the printing head 31 by way of a print controller 142, to print the required information on the aligned discrete area. When printing is completed, the stepping motor 22 is operated to move the printing head to the next discrete area in the row.

When all of the discrete areas in the row have had printing applied to them, the printing head 31 is brought back to its starting position and the stepping motor 30 is activated to bring the next row of discrete areas into registration with the printing head. The above process is continued until all of the rows of blisters have had their contents identified in writing on the discrete areas of the backing sheet 4 associated with them as illustrated diagrammatically in FIG. 4. The motor 30 then operates to return the loaded blister package to its starting position at which it can be removed from the table 19 and replaced with a new and unprinted blister package.

One example of a thin card folder used in conjunction with the above described apparatus to produce a cheap, disposable yet stiffened blister package, in shown in cut-away form in FIG. 6. This figure shows an open folder 40 having a central crease line 41 dividing it into two rectangular sides 42 and 43. Each side is formed with a rectilinear array of windows 44 arranged in columns 45 and rows 46. There are seven rows corresponding to the days of the week, and four columns corresponding to times of the day at which prescribed medication is to be taken. The columns and rows are so marked on, the remote face (not shown) of the side 42

The array of windows 44 is identical on both sides 42 and 43 of the folder, and the two arrays are so arranged that when the folder is folded about the crease line 41 the windows 44 of the two arrays register precisely with one another.

The faces of the two sides 42,43 of the folder 40 which are moved towards one another when the folder 40 is folded about the crease line 41, are covered with a respective layers 47,49 of a pressure-sensitive adhesive which responds to pressure only, to effect sealing, and does not require heat. The portion of the adhesive layer 47 on the face of the side 42 of the folder holds in place a thin frangible metal foil 48 capable of being ruptured by finger pressure and, at least in this example, covered on one side by a fibrous paper web suitable for receiving printing. The face of the foil 48 remote from the folder side 42 is also covered by with a layer of a pressure-sensitive adhesive 50 having a pattern corresponding precisely to the pattern of the array of windows 44 beneath the foil.

A waxy paper cover slip 51 covers the pattern 50 of adhesive which otherwise would be exposed, and also the adhesive layer 49 on the folder side 43. The paper cover slip can be easily manually stripped off the adhesive layers when the folder is to be used.

To use the folder, the cover slip 51 is first removed and the open folder shown in FIG. 6 is placed on the table 18 of FIG. 5 with the array of windows 44 on the folder side 43 respectively registering with the apertures 19 in the table. A blister sheet to be loaded is placed on the table 18 so that its respective blisters extend downwardly through the windows 44 of the folder side 43 into respective apertures 19. This holds the blister package and folder in place.

The medication doses prescribed by a medical practitioner are then loaded into the cavities of the blisters. When loading is completed, the side 42 of the folder 40 is folded about the crease line 41 to bring the two sides of the folder together. The adhesive pattern 50 on the foil contacts the folder side 42. However none of the adhesive layer 50 is exposed to the contents of the cavities as its pre-arranged pattern confines it to the parts of the card around the windows 44.

The table 18 is next driven under a pressure roller which temporarily makes the adhesive layers slightly tacky so that the combination of folder 40, foil backing strip 48 and blister sheet are bonded firmly together and the individual cavities of the blisters are sealed from one another and from the ambient air, by the foil.

The table is finally returned to its initial position in steps and at each step the contents of each column of blisters is written on discrete areas of the paper web on the foil with a non-contact printing head, as described with reference to FIG. 5, so that the printing appears only on the discrete areas of the backing sheet individually framed by the windows formed in the folder side 42.

Variations of the Preferred Embodiment

The invention may be used to assemble a blister package which is to be used in conjunction with a re-usable plastics folder providing a windowed stratum, or with a blister package which is formed into a unitary assembly with a disposable card folder providing the stratum, as shown in FIG. 6.

Although it is preferred to control the spatial separation of the irregular surface profile of the folder from the printing head by way of information provided by the bar-code, it is not essential that the spatial separation is controlled in this way. For example it may be manually controlled from information provided to the user of the apparatus, or controlled from information provided from some source other than the bar-code on the attachment sheet.

Finally the use of a fibrous paper web covering one side of the foil may be dispensed with if another technique is employed for applying print to discrete areas of a frangible foil is preferred.

Although the different aspects of the invention have been described in detail in relation to sealing blister packages containing prescribed medication doses, it should be understood that there are other industrial applications where there is a need for print to be deposited on discrete zones of an irregular surface profile or for identifying the contents of cavities of a blister sheet containing other objects than prescribed medication doses.

The invention claimed is:

1. Apparatus for printing information on respective ones of an array of discrete areas of a backing sheet, the backing sheet covering a plurality of cavities of a blister sheet of a blister package on which information is to be printed by the apparatus, such information describing the contents of the blister beneath a respective discrete area, and the backing sheet being covered by an attached salient stratum having an irregular surface profile and including windows individually defining the discrete areas, the apparatus comprising:

a reader arranged to extract information from a bar-code printed on a component of the blister package;

a liquid-jet printer including a non-contact printing head;

a horizontal table;

a drive system including two stepping motors, for producing relative stepping movement between the backing sheet and the non-contact printing head to bring the printing head into alignment with each of the discrete areas in turn, a first one of the stepping motors producing relative movement between the printing head and respective ones of the discrete areas in a row of the discrete areas by moving the printing head in a horizontal first direction relative to the table, and a second one of the stepping motors producing relative movement between the printing head and respective ones of the discrete areas in a column of the discrete areas by moving the printing head relative to the table in a horizontal second direction perpendicular to the first direction;

an adjustment mechanism arranged to adjust the positions of the printing head and the horizontal table relative to each other in a vertical direction;

a processing unit for supplying the printing head with information provided by the reader, derived from the bar-code and significant of the contents of the blister associated with a particular discrete area on which printing is to take place and for controlling the adjustment mechanism to adjust the positions of the printer head and the horizontal table relative to each other in response to information from the bar-code so as to provide a spatial separation between the printing head and the irregular surface profile of the stratum.

* * * * *